(12) United States Patent
Bean et al.

(10) Patent No.: US 11,755,056 B2
(45) Date of Patent: Sep. 12, 2023

(54) FORCE COMPENSATION METHOD AND DEVICE

(71) Applicant: BAE SYSTEMS plc, London (GB)

(72) Inventors: Jason Howard Bean, Rochester Kent (GB); Justin Mark Dee, Rochester Kent (GB)

(73) Assignee: BAE Systems PLC, London (GB)

( * ) Notice: Subject to any disclaimer, the term of this patent is extended or adjusted under 35 U.S.C. 154(b) by 0 days.

(21) Appl. No.: 17/625,951

(22) PCT Filed: Jun. 18, 2020

(86) PCT No.: PCT/GB2020/051473
§ 371 (c)(1),
(2) Date: Jan. 10, 2022

(87) PCT Pub. No.: WO2021/005328
PCT Pub. Date: Jan. 14, 2021

(65) Prior Publication Data
US 2022/0244754 A1    Aug. 4, 2022

(30) Foreign Application Priority Data

Jul. 11, 2019 (GB) .................................. 1909963
Sep. 4, 2019 (EP) .................................. 19195273

(51) Int. Cl.
*G09G 5/08* (2006.01)
*G05G 9/047* (2006.01)
(Continued)

(52) U.S. Cl.
CPC .............. *G05G 9/047* (2013.01); *G05G 5/03* (2013.01); *G06F 3/016* (2013.01); *G06F 3/0346* (2013.01); *G05G 2009/04766* (2013.01)

(58) Field of Classification Search
None
See application file for complete search history.

(56) References Cited

U.S. PATENT DOCUMENTS 4,236,325 A    12/1980   Hall et al.
5,532,476 A    7/1996   Mikan
(Continued)

FOREIGN PATENT DOCUMENTS

CN         1175017 A    3/1998
EP         3023794 A2    5/2016
(Continued)

OTHER PUBLICATIONS

International Search Report and Written Opinion received for PCT Application No. PCT/GB2020/051473. dated Aug. 11, 2020. 9 pages.
(Continued)

*Primary Examiner* — Carl Adams
(74) *Attorney, Agent, or Firm* — Finch & Maloney PLLC

(57) ABSTRACT

A method to obtain total compensation force information of a user input device is disclosed. The method comprising obtaining velocity information of a portion of the user input device. Obtaining acceleration information of the portion of the user input device. Obtaining damping force information force based on the velocity information. Obtaining inertial compensation force information based on the acceleration information. Combining the damping compensation force and inertial compensation force to provide the compensation force information of the user input device.

18 Claims, 7 Drawing Sheets

(51) Int. Cl.
*G05G 5/03* (2008.04)
*G06F 3/01* (2006.01)
*G06F 3/0346* (2013.01)

(56) References Cited

U.S. PATENT DOCUMENTS

| | | | |
|---|---|---|---|
| 5,734,373 A * | 3/1998 | Rosenberg | A63F 13/285 345/161 |
| 6,342,880 B2 * | 1/2002 | Rosenberg | A63F 13/23 345/161 |
| 6,580,418 B1 | 6/2003 | Grome et al. | |
| 7,432,908 B2 | 10/2008 | Rutledge et al. | |
| 7,757,579 B2 | 7/2010 | Bloch | |
| 8,345,004 B1 | 1/2013 | Kass et al. | |
| 9,156,546 B2 | 10/2015 | Irwin, III et al. | |
| 2006/0007181 A1 | 1/2006 | Jung et al. | |
| 2011/0050563 A1 | 3/2011 | Skutt | |
| 2015/0130730 A1 * | 5/2015 | Harley | G06F 3/016 345/173 |
| 2016/0004270 A1 | 1/2016 | Taylor et al. | |
| 2017/0242444 A1 * | 8/2017 | Eggold | G05D 1/0676 |
| 2017/0367773 A1 | 12/2017 | Kottenstette et al. | |
| 2020/0103897 A1 * | 4/2020 | Thornberg | B64D 43/00 |
| 2022/0242554 A1 | 8/2022 | Bean et al. | |

FOREIGN PATENT DOCUMENTS

| | | |
|---|---|---|
| GB | 2549272 A | 10/2017 |
| GB | 2587469 A | 3/2021 |
| WO | 2021005328 A1 | 1/2021 |
| WO | 2021005329 A | 1/2021 |

OTHER PUBLICATIONS

GB Search Report under Section 17(5) received for GB Application No. 1909963.9, dated Jan. 13, 2020. 3 pages.
Extended European Search Report received for EP Application No. 19195273.8, dated Jan. 23, 2020. 7 pages.
International Search Report and Written Opinion received for PCT Application No. PCT/GB2020/051477. dated Sep. 15, 2020. 17 pages.
GB Search Report under Sections 17 and 18(3) received for GB Application No. 2009323.3, dated Dec. 11, 2020. 6 pages.
GB Search Report under Sections 17 and 18(3) received for GB Application No. 2109820.7, dated Nov. 5, 2021. 5 pages.
GB Search Report under Section 17(5) received for GB Application No. 1909962.1, dated Jan. 8, 2020. 4 pages.
Extended European Search Report received for EP Application No. 19195209.2, dated Apr. 17, 2020. 12 pages.
International Preliminary Report on Patentability received for PCT/GB2020/051473, dated Jan. 20, 2022. 8 pages.
International Preliminary Report on Patentability received for PCT/GB2020/051477, dated Jan. 20, 2022. 13 pages.

\* cited by examiner

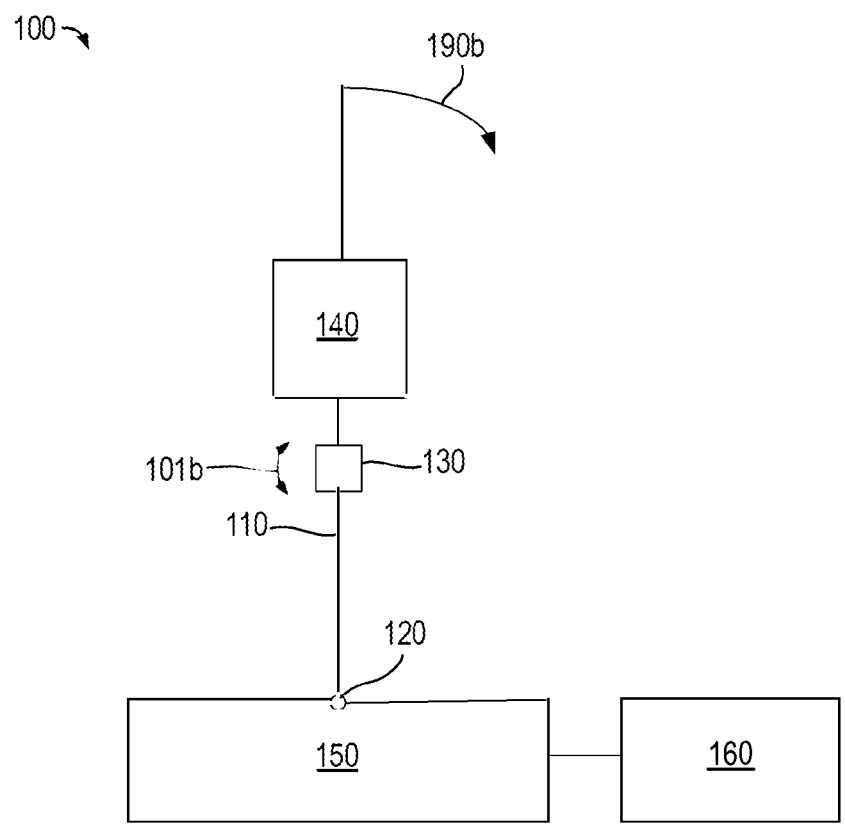

FORCE COMPENSATION METHOD AND DEVICE

BACKGROUND

Active inceptors provide force feedback to an operator of a user input device through internally simulating a feel model, one example being a mass-spring-damper (MSD) system, and driving an actuated mechanism to mimic the dynamic performance of the feel model.

BRIEF DESCRIPTION OF DRAWINGS

FIG. 1c illustrates an active input device when the device is moved by a user input force.

DETAILED DESCRIPTION

Active inceptor systems may be used to provide force feedback to a user input device. An active inceptor system may be used in control of flight surfaces of aircraft, such as helicopters or aeroplanes. However, they may also have applications in other vehicles or any other application where force feedback is useful.

Figure 1A:
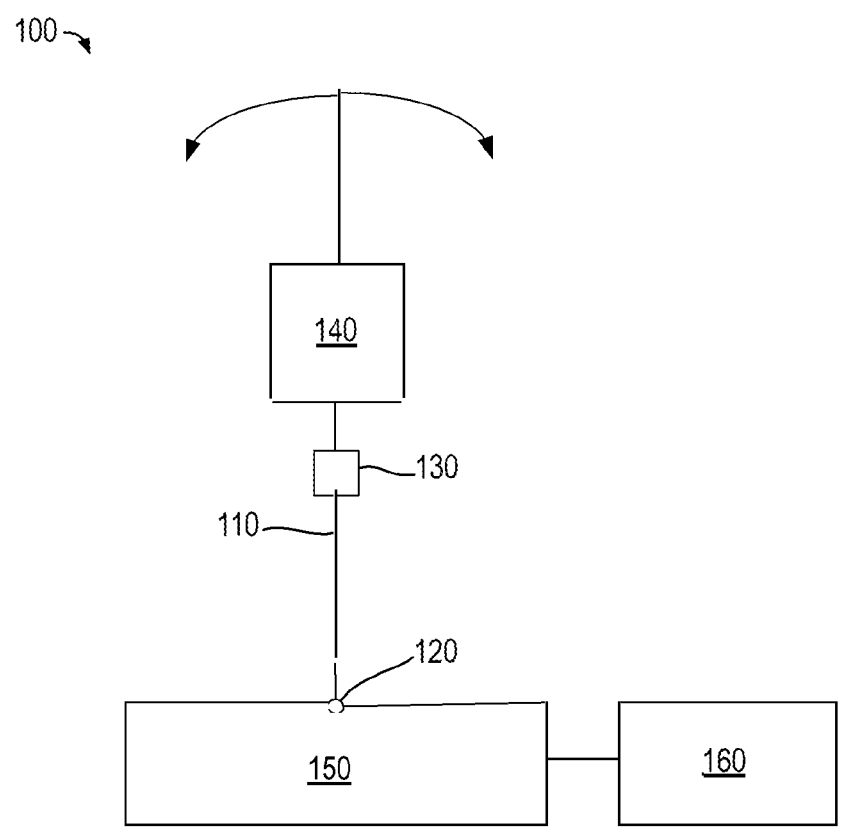
FIG. 1a illustrates an active input device according to some examples.

An active inceptor system 100 is illustrated in FIG. 1a. Active inceptor system 100 comprises a user input device 110, a pivot 120, a force sensor 130, and a grip portion 140. The active input device also comprises mechanism 150 and force feedback circuitry 160. The active inceptor system 100 may also comprise other sensors, not indicated in FIG. 1a, for example position, velocity and/or acceleration sensors. The active inceptor system 100 may also comprise more than one force sensor and/or other type of sensor.

The user input device 110 may move about the pivot 120 in at least one axis. The user may grip the user input device 110 using grip portion 140, although they are not limited to gripping the user input device 110 at grip portion 140.

The user input device 110 may be a stick, an inceptor, or throttle. The user input device 110 may have any shape. The grip portion 140 may be the part of the user input device 110 that is designed for the user to hold. Grip portion 140 may also be merely a portion of user input device 110 that has a different mass or profile than the rest of the user input device 110.

Force sensor 130 is illustrated as being coupled to the user input device 110, however it may be positioned in any location that still enables the user input force to be determined. For example, it may be located on the grip portion 140, the user input device 110, pivot 120 or mechanism 150.

Force feedback may be provided to the user input device 110 with a force feedback control loop using force feedback circuitry 160. Force feedback system 160 may internally simulate a feel model, such as a second order mass-spring-damper (MSD) model, although other models may be used. The force feedback circuitry 160 may cause mechanism 150 to apply a force to the user input device 110, the force dependent upon predetermined settings and chosen feel model.

A user may also input an operator force on the user input device 110 to move the user input device 110. The user may feel a feedback force from mechanism 150 dependent upon the predetermined settings and chosen feel model.

Due in part to the inertia of the mass of the grip portion 140, when movement of the user input device 110 is initiated, either by user input force or the mechanism 150, a force is felt on the force sensor 130. The magnitude and direction of the force is dependent upon at least the location of the force sensor 130, the direction of the applied force, and whether the movement is initiated by the mechanism 150 or by the user (i.e. the relationship between the location of the force sensor 130 and the position of the user or mechanism applied force).

Figure 1B:
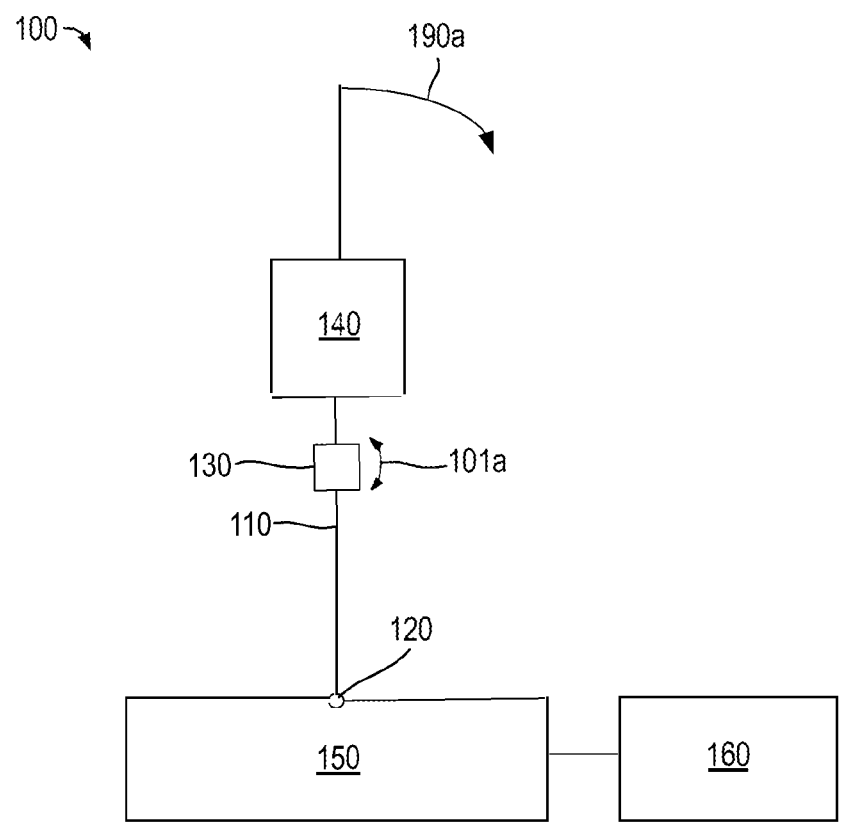
FIG. 1b illustrates an active input device when the device is moved by a mechanical means.

Two examples of the force felt on the force sensor 130 are illustrated in FIGS. 1b and 1c.

In FIG. 1b, the movement is initiated by the mechanism 150, moving the user input device 110 in direction 190a about the pivot 120. Inertial effects, since the grip portion 140 has a mass that resists movement, cause a tension force 101a to be felt on the right hand side of force sensor 130. Similarly the inertial effects would cause a compression on the other side of the force sensor 130.

In FIG. 1c the movement is initiated by a user applying a force causing the user input device 110 to move in the direction 190b about the pivot 120. The force may be applied at the grip portion 140 (i.e. above the force sensor). The force applied by the user, may be felt as a tension 101b on the left hand side of the force sensor 130. Similarly the inertial effects would cause a compression on the other side of the force sensor 130.

The force induced due to the inertial effects is a physical property of the active inceptor system 100. However to improve the system bandwidth the forces induced due to the inertial effects should be mitigated. If the inertial forces are not mitigated, then they may limit the maximum bandwidth of the active input device system 100, deteriorating the tactile feel of the active input device, in some examples making it feel sluggish. This in turn may limit performance of the user and/or vehicle the active inceptor system 100 controls.

The user input device 110 may comprise a stick or an inceptor, or any other appropriate input device. The active inceptor system 100 may be used to control the flight surfaces of an aircraft. The active inceptor system 100 may be used to control vehicles, such as trains. The active inceptor system 100 may also be used for other applications, and is not limited to being applied to vehicles.

The force sensor 130 may comprise a strain gauge, such as a wheatstone bridge type arrangement, although it is not limited to this type of sensor.

Figure 2:
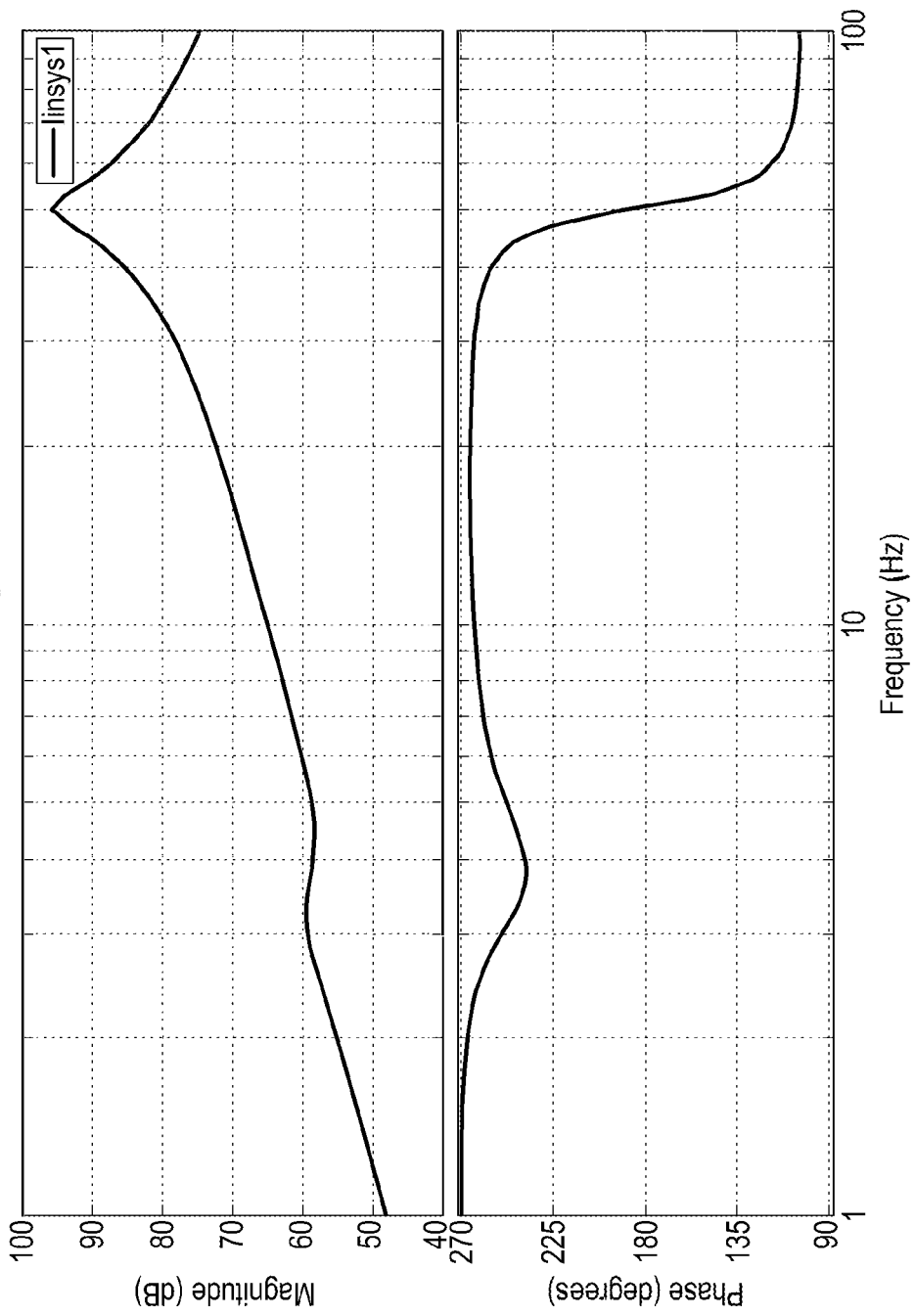
FIG. 2 illustrates sensed force as a magnitude of user input device positon, showing the magnitude of unwanted forces.

FIG. 2 is an exemplary Bode plot of sensed force plotted against inceptor position. The response is very similar to an inverted 2nd order mass-spring-damper model, and the reason this looks so similar is because that is substantially what is happening within the active inceptor system 100. To counteract the reduction in bandwidth due to the inertial forces, an estimate of the transfer function illustrated in FIG. 2 may be determined.

The transfer function may be estimated by determining a total compensation force, which may be removed from the sensed force sensed by force sensor 130. The total compensation force is determined by determining a damping force and an inertial force. The damping force is dependent upon the velocity of the grip portion 140, and the inertial force is dependent upon the acceleration of the grip portion 140.

Figure 3:
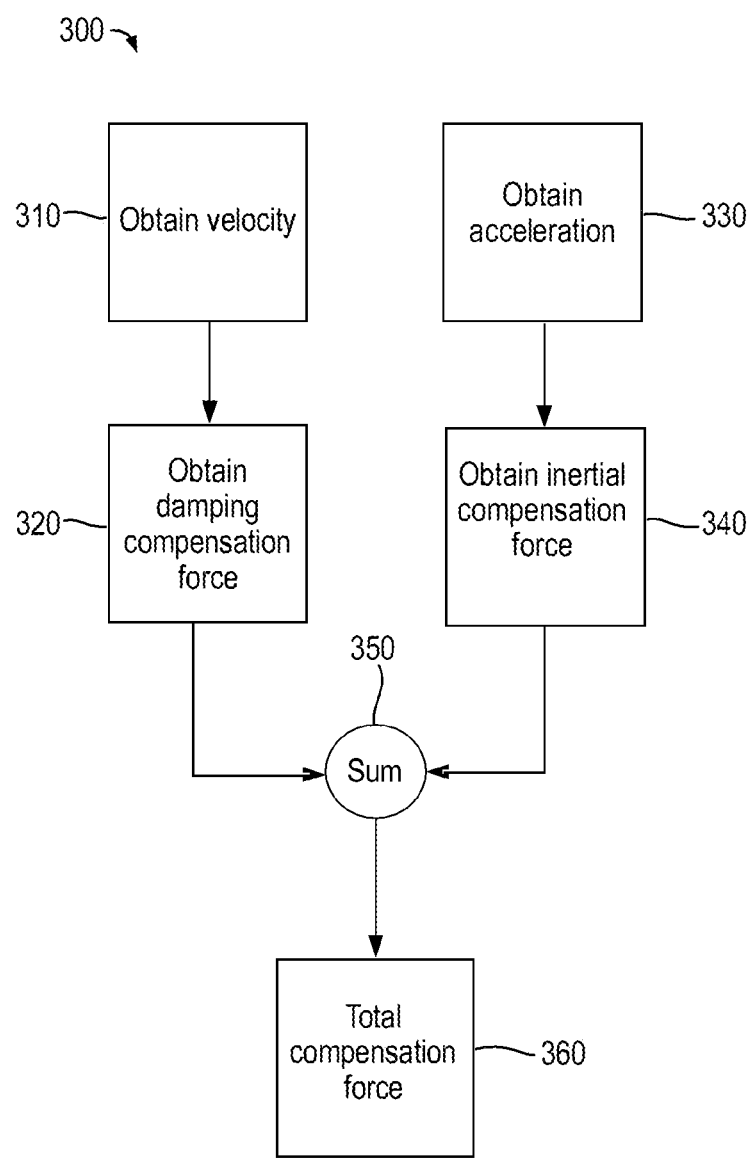
FIG. 3 illustrates a method to determine a compensation force according to some examples.

A method, 300, to determine the total compensation force information is illustrated in FIG. 3. The method comprises obtaining, 310, velocity information of the user input device and/or grip portion. The damping force information is obtained, 320, based on the velocity information.

At substantially the same time as the velocity information is obtained the acceleration information is obtained 330. The inertial force information may be obtained, 340, based on the acceleration information.

The damping force information and inertial force information are combined 350 by summing to produce total compensation force information 360. The total compensation force information may then be provided to the force feedback circuitry 160 which may use it to update the sensed force supplied to the model to provide compensated force information.

The velocity information may be obtained without using a velocity sensor, or may be obtained using a velocity sensor close to or on the grip portion 140.

In some examples obtaining, 310, velocity information of the user input device and/or grip portion may comprise obtaining position information of the user input device 110 from a position sensor located close or on the grip portion 140 and differentiating the position information to obtain the velocity information.

In some examples obtaining, 310, velocity information of the user input device and/or grip portion may comprise obtaining acceleration information of the user input device 110 from an acceleration sensor located close to or on the grip portion 140 and integrating the acceleration information.

In some examples the acceleration information may be obtained from an acceleration sensor close to or on the grip portion 140. In some examples, obtaining, 330, acceleration information may comprise double differentiating a sensed position of the user input device or differentiating a velocity.

In some examples obtaining, 320, the damping force information may comprise multiplying the velocity information with a damping constant. The damping constant may depend on the physical properties of the active inceptor system 100, and may be predetermined.

In some examples obtaining, 340, the inertial force information may comprise multiplying the acceleration information with an inertia constant. The inertial constant may depend on the physical properties of the active inceptor system 100, and may be predetermined.

The accuracy of the total compensation force information may be improved by locating the sensors as close as possible to the grip portion 140, or on the grip portion 140. This is because structural flexure between the actual grip position and the location of the sensor may cause inaccuracies to build up in the sensed output.

Figure 4:
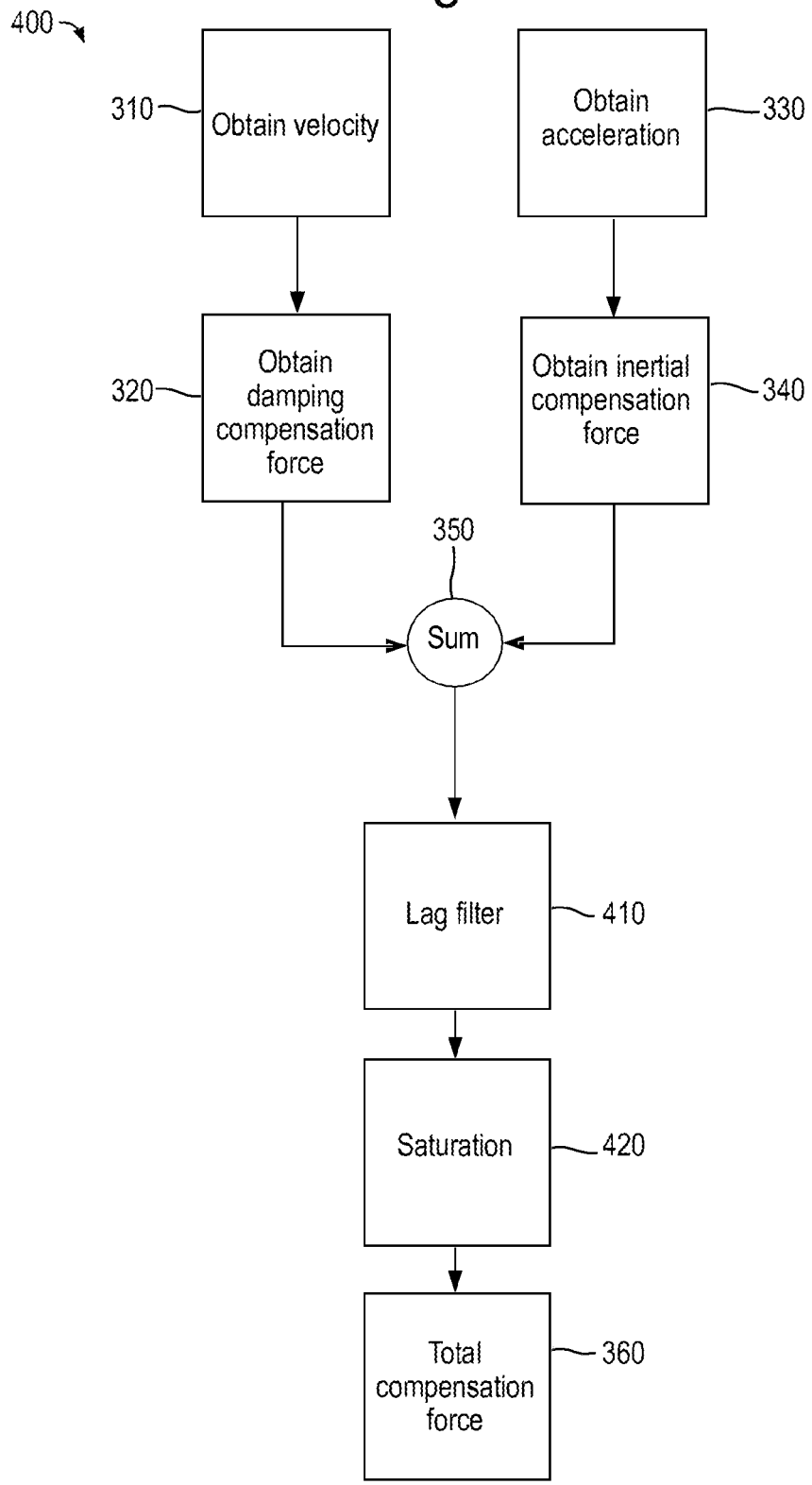
FIG. 4 illustrates a noise cancelling method to determine a compensation force according to some examples.

FIG. 4 illustrates a method, 400, in accordance with some examples. The method 400 is substantially the same as the method described in relation to FIG. 3, and any of the features described above may be applied to the method 400. The method also comprises applying, 410, a lag filter to the summed inertial compensation force information and damping compensation force information, and applying, 420, a saturation limit to the filtered total compensation force information.

A lag filter may be applied, 410, as the velocity and/or acceleration information may have high levels of noise, for example due to the use of differentiators. Using a lag filter reduces the noise of the signal. Although the lag filter is shown as occurring after the summation, is it to be understood that the lag filter could be used at any suitable positon in the method. Furthermore, other methods to reduce noise could be used instead or in addition to the application of the lag filter. There could also be more than one lag filter, for example a separate lag filters may be used at any point in the method.

Applying, 420, the saturation limit, limits the magnitude of the compensation force information to be below a predetermined value. The predetermined value may be equal to the available maximum grip force which is the maximum force a pilot is expected to apply. Limiting the compensation force information to be below a predetermined value allows for unexpectedly large forces to be identified and not summed with the sensed force. Summing an unexpectedly large force with the sensed force may reduce the performance of the active inceptor system 100. An unexpectedly large force might be result when double differentiating a position signal, which can lead to very large transient spikes in response.

Figure 5:
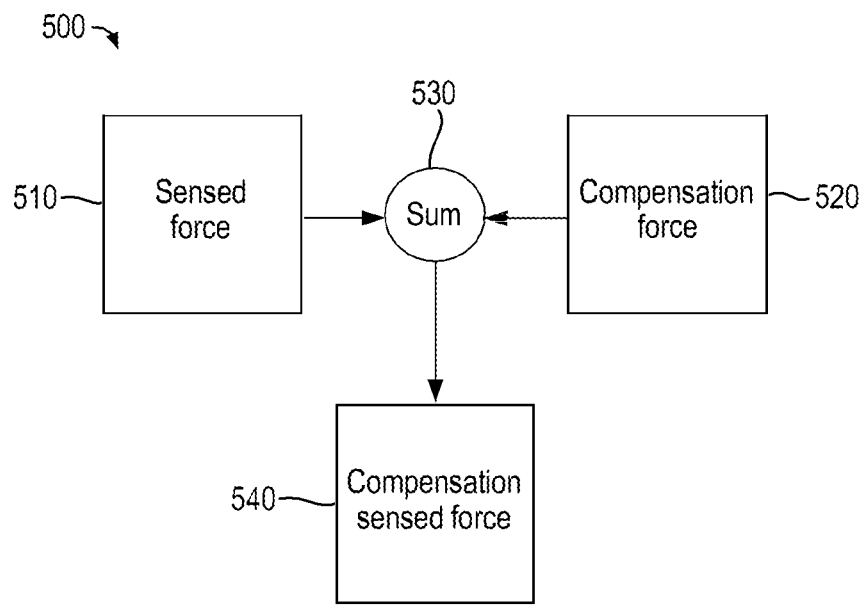
FIG. 5 illustrates a method to determine a compensated sensed force according to some examples.

FIG. 5 illustrates a method to obtain, 500, the compensated sensed force information 540. The sensed force 510 may be summed 530 with the compensation force information 520 to obtain the compensated sensed force 540. The compensated force 540 may then be provided to the force feedback circuitry 160 in order to calculate the appropriate force to apply to the user input device 110 using the mechanism 150.

Figure 6:
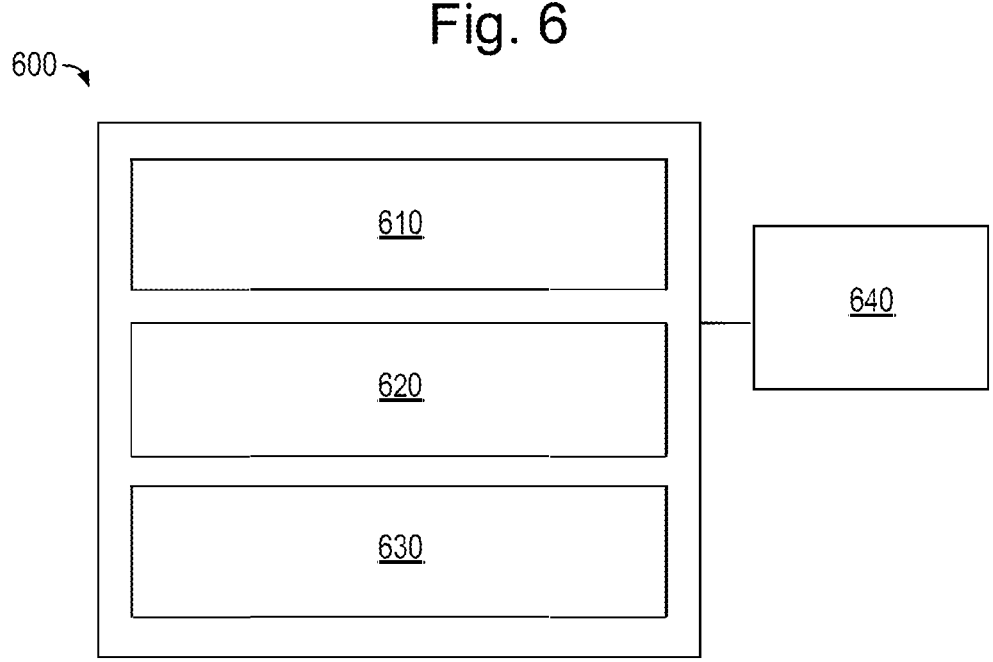
FIG. 6 illustrates a computer readable medium in accordance with some examples.

FIG. 6 illustrates a computer readable medium 600 in accordance with some examples. Computer readable medium 600 comprises a damping force module 610 comprising instructions, that when executed, cause a processing means 640 to obtain damping force information. Computer readable medium 600 also comprises an inertial force module 620 comprising instructions, that when executed, cause a processing means 640 to obtain inertial force information. Computer readable medium 600 comprises a total compensation force module 630 comprising instructions, that when executed, cause a processing means 640 to obtain total compensation force information.

The description refers to position information, velocity information, acceleration information, inertial force information, damping force information, and total compensation force information. This is because the method and systems may not require an absolute value of the variables to be calculated. In some examples the position information, velocity information, acceleration information, inertial force information, damping force information, and total compensation force information may comprise absolute values, in some examples they may be proportionate to the actual absolute value.

The methods described may be performed in any appropriate order and are not limited to the order as described in the description.

The invention claimed is:

1. A method to obtain total compensation force information of a user input device, the method comprising:
    obtaining, by a position sensor, velocity information of a portion of the user input device;
    obtaining, by the position sensor, acceleration information of the portion of the user input device;
    obtaining damping compensation force information based on the velocity information;

obtaining inertial compensation force information based on the acceleration information, the inertial compensation force information representing physical inertial effects of the portion of the user input device;

combining the damping compensation force information and the inertial compensation force information to provide the total compensation force information of the user input device;

compensating the sensed force acting on the user input device by removing the total compensation force information of the user input device from a force sensed by a force sensor of the user input device; and applying, by a mechanism, a force to the user input device based on the compensated sensed force and a feel model.

2. The method according to claim 1, wherein a magnitude of the total compensation force information of the user input device is limited to be below a threshold value.

3. The method according to claim 1, comprising differentiating a sensed position of the user input device to obtain the velocity information.

4. The method according to claim 1, comprising double differentiating a sensed position of the user input device or differentiating a velocity of the user input device to obtain the acceleration information.

5. The method according to claim 1, comprising integrating acceleration information to obtain the velocity information.

6. The method according to claim 1, comprising:
applying a lag filter to the total compensation force information of the user input device, to provide filtered compensation force information; and
compensating a sensed force acting on the user input device based on the filtered compensation force information.

7. The method according to claim 1, wherein obtaining the damping force information comprises multiplying the velocity information with a damping constant.

8. The method according to claim 1, wherein obtaining the inertial compensation force information comprises multiplying the acceleration information with an inertia constant.

9. The method according to claim 1, wherein combining the damping compensation force information and inertial compensation force information comprises adding the damping compensation force information to the inertial compensation force information.

10. The method according to claim 1, wherein the portion of the user input device comprises an acceleration sensor.

11. The method according to claim 1, wherein obtaining velocity information comprises obtaining velocity information in at least one axis.

12. The method according to claim 1, wherein obtaining the acceleration information comprises obtaining velocity information in at least one axis.

13. An active inceptor system comprising circuitry configured to perform the method of claim 1.

14. A computer readable storage medium comprising instructions that when executed by one or more processors cause a process to be carried out to obtain total compensation force information of a user input device, the process comprising:

obtaining, by a position sensor, velocity information of a portion of the user input device;

obtaining, by the position sensor, acceleration information of the portion of the user input device;

obtaining damping compensation force information based on the velocity information;

obtaining inertial compensation force information based on the acceleration information, the inertial compensation force information representing physical inertial effects of the portion of the user input device;

combining the damping compensation force information and the inertial compensation force information to provide the total compensation force information of the user input device;

compensating the sensed force acting on the user input device by removing the total compensation force information of the user input device from a force sensed by a force sensor of the user input device; and applying, by a mechanism, a force to the user input device based on the compensated sensed force and a feel model.

15. The computer readable storage medium according to claim 14, the process comprising:
differentiating a sensed position of the user input device to obtain the velocity information;
differentiating a sensed position of the user input device or a velocity of the user input device to obtain the acceleration information; and/or
integrating acceleration information to obtain the velocity information.

16. The computer readable storage medium according to claim 14, the process comprising:
applying a lag filter to the total compensation force information of the user input device, to provide filtered compensation force information; and
compensating a sensed force acting on the user input device based on the filtered compensation force information.

17. The computer readable storage medium according to claim 14, wherein:
obtaining the damping compensation force information comprises multiplying the velocity information with a damping constant;
obtaining the inertial compensation force information comprises multiplying the acceleration information with an inertia constant; and/or
combining the damping compensation force information and inertial compensation force information comprises adding the damping compensation force information to the inertial compensation force information.

18. An active inceptor system comprising the computer readable storage medium according to claim 14 and at least one of the force sensor, the position sensor, a velocity sensor, and an acceleration sensor.

* * * * *